(12) United States Patent
Yingling et al.

(10) Patent No.: US 8,011,465 B2
(45) Date of Patent: Sep. 6, 2011

(54) AIR INTAKE PLENUM FOR AIR INDUCTION CHANNEL

(75) Inventors: Kerry E. Yingling, Fort Wayne, IN (US); Tim Juan, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 446 days.

(21) Appl. No.: 12/269,929

(22) Filed: Nov. 13, 2008

(65) Prior Publication Data

US 2010/0116238 A1    May 13, 2010

(51) Int. Cl.
*B60K 13/02*    (2006.01)
(52) U.S. Cl. ...................... 180/68.3; 180/69.2
(58) Field of Classification Search ................. 180/68.3, 180/69.2, 68.1, 68.2
See application file for complete search history.

(56) References Cited

U.S. PATENT DOCUMENTS

| | | | |
|---|---|---|---|
| 1,855,038 A | | 4/1932 | Walker |
| 3,232,368 A | * | 2/1966 | Sullivan ...................... 180/68.3 |
| 4,354,458 A | * | 10/1982 | Bury ........................ 123/184.38 |
| 4,420,057 A | * | 12/1983 | Omote et al. ................ 180/68.3 |
| 4,548,166 A | * | 10/1985 | Gest .......................... 123/198 E |
| 4,699,639 A | * | 10/1987 | Gieseke et al. .............. 55/385.3 |
| 4,917,202 A | | 4/1990 | Glover, Jr. et al. |
| 4,932,490 A | * | 6/1990 | Dewey ........................ 180/68.3 |
| 4,971,172 A | * | 11/1990 | Hoffman et al. ............. 180/68.3 |
| 5,022,479 A | * | 6/1991 | Kiser et al. .................. 180/68.3 |
| 5,042,603 A | * | 8/1991 | Olson .......................... 180/68.3 |
| 5,054,567 A | * | 10/1991 | Hoffman ...................... 180/68.2 |
| 5,139,458 A | * | 8/1992 | Koukal et al. ................. 454/147 |
| 5,564,513 A | * | 10/1996 | Wible et al. .................. 180/68.3 |
| 5,618,323 A | * | 4/1997 | Shearn et al. ................. 55/385.3 |
| 5,660,243 A | * | 8/1997 | Anzalone et al. ............ 180/68.1 |
| 5,794,733 A | * | 8/1998 | Stosel et al. ................. 180/68.1 |
| 6,230,832 B1 | * | 5/2001 | von Mayenburg et al. .. 180/68.1 |

(Continued)

FOREIGN PATENT DOCUMENTS

EP    0734898 A    10/1996

OTHER PUBLICATIONS

PCT Search Report and Written Opinion dated Feb. 17, 2010 for application No. PCT/US09/64175. International Preliminary Report on Patentability dated May 26, 2011 for corresponding application No. PCT/US09/64175.

*Primary Examiner* — Jeffrey J Restifo
(74) *Attorney, Agent, or Firm* — Jeffrey P. Calfa; Mark C. Bach

(57) ABSTRACT

An air intake plenum (100) disposed in an air induction channel (112) in a hood (116) defined by a bottom channel wall (120), a rear hood reinforcement wall (122), a cab wall (124), and an exterior skin (126), where the air induction channel extends between an air inlet (114) laying in a plane generally parallel with the direction of travel "T" of the vehicle to an air outlet (118), includes a plenum inlet (128). The plenum inlet (128) is generally co-planar with the air inlet (114) of the air induction channel (112). At least one side wall (136, 138) extends from the plenum inlet (128) to a plenum outlet (144) and is angled downwards towards the bottom channel wall (120). Air through the plenum inlet (128) impinges against the side wall (136, 138), exits the plenum outlet (144), and is directed to impinge against the bottom channel wall (120) of the air induction channel (112) where contaminants drop out of the air.

20 Claims, 6 Drawing Sheets

U.S. PATENT DOCUMENTS

| | | |
|---|---|---|
| 6,736,447 B2 * | 5/2004 | Angelo et al. ............. 296/180.1 |
| 7,044,848 B2 | 5/2006 | Wijaya et al. |
| 7,163,073 B2 | 1/2007 | Schmid et al. |
| 7,523,798 B2 * | 4/2009 | Muramatsu et al. ......... 180/68.1 |
| 2004/0262061 A1 * | 12/2004 | Bahr et al. ................... 180/69.2 |
| 2006/0048986 A1 * | 3/2006 | Bracciano .................... 180/69.2 |
| 2010/0116238 A1 * | 5/2010 | Yingling et al. .......... 123/184.47 |
| 2010/0140004 A1 * | 6/2010 | Ohzono et al. ............... 180/68.3 |

* cited by examiner

FIG. 1
PRIOR ART
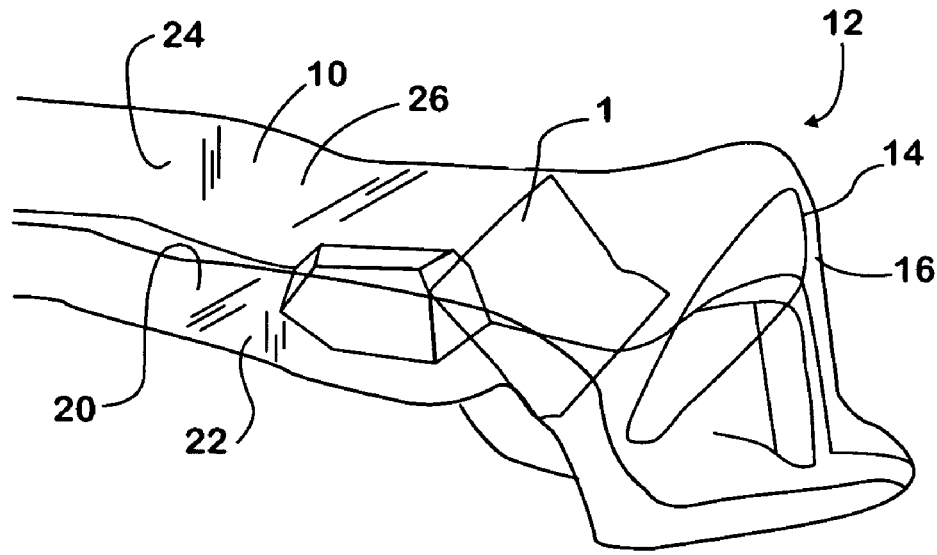
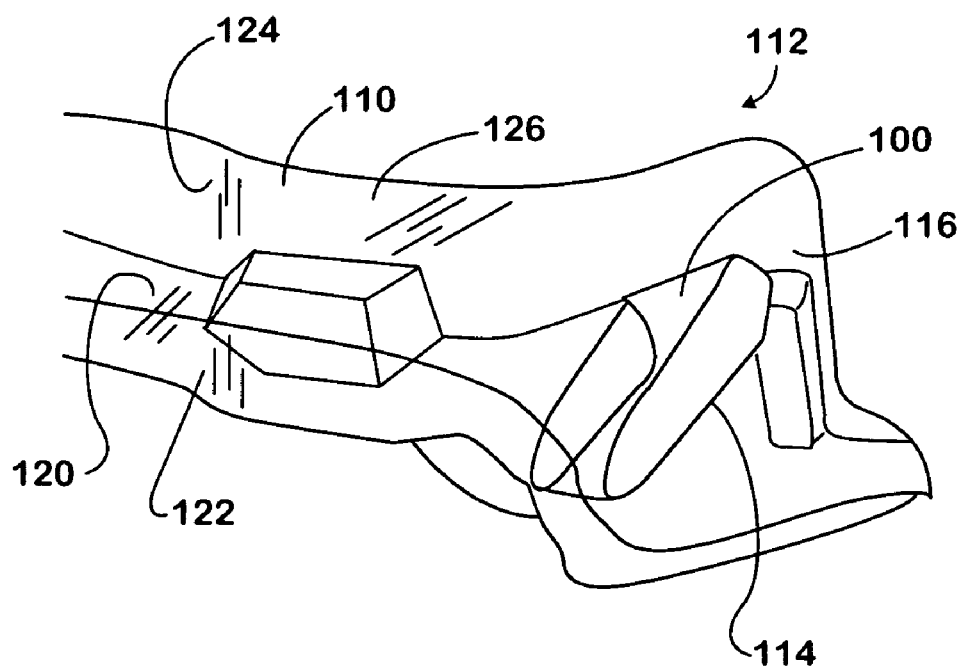
FIG. 3

AIR INTAKE PLENUM FOR AIR INDUCTION CHANNEL

FIELD OF THE INVENTION

The present invention relates generally to air induction channels for an internal combustion engine, and more particularly, to an air inlet assembly to block contaminant materials from the outlet of the air induction channel.

BACKGROUND OF THE INVENTION

It is previously known to provide ducts within a truck hood to deliver air from the vehicle exterior to the engine. U.S. Pat. No. 3,232,368 to Sullivan teaches a molded fiberglass hood having a rear reinforcement beam bonded to the skin which defines a duct opening through the skin at the rear portion of the hood sides. Within the engine compartment, the duct interfaces with the engine air cleaner to draw induction air into the engine.

Although there are commercial vehicles which utilize a hood ducting system similar to that of Sullivan, the external air inlets are typically located on the top or sides of the hood adjacent the rear portion thereof, to achieve the shortest passage and, accordingly, the minimum air restriction at the engine. However, these short passages also result in road splash, water, dirt, and other contaminants to be drawn into the hood ducts to be dealt with by the engine air cleaner.

The problem of contaminant materials has been addressed by providing a baffle structure into the air duct. However, providing a baffle structure into the air duct reduced the air flow in the duct, causing an increase in the pressure drop in the duct. In turn, the increase in pressure drop increases the amount of work the engine performs to obtain air for combustion.

SUMMARY OF THE INVENTION

An air intake plenum is disposed in an air induction channel in a hood defined by a bottom channel wall, a rear hood reinforcement wall, a cab wall, and an exterior skin, where the air induction channel extends between an air inlet laying in a plane generally parallel with the direction of travel of the vehicle to an air outlet. The air intake plenum includes a plenum inlet. The plenum inlet is generally co-planar with the air inlet of the air induction channel. At least one side wall extends from the plenum inlet to a plenum outlet and is angled downwards towards the bottom channel wall. Air through the plenum inlet impinges against the side wall, exits the plenum outlet, and is directed to impinge against the bottom channel wall of the air induction channel where contaminants drop out of the air.

BRIEF DESCRIPTION OF THE DRAWINGS

FIG. 1 is a side perspective view of a prior art baffle located in the hood portion of an air induction channel.

FIG. 3 is a perspective view of a plenum located in the hood portion of the air induction channel in accordance with the invention.

DESCRIPTION OF A PREFERRED EMBODIMENT

Figure 2:
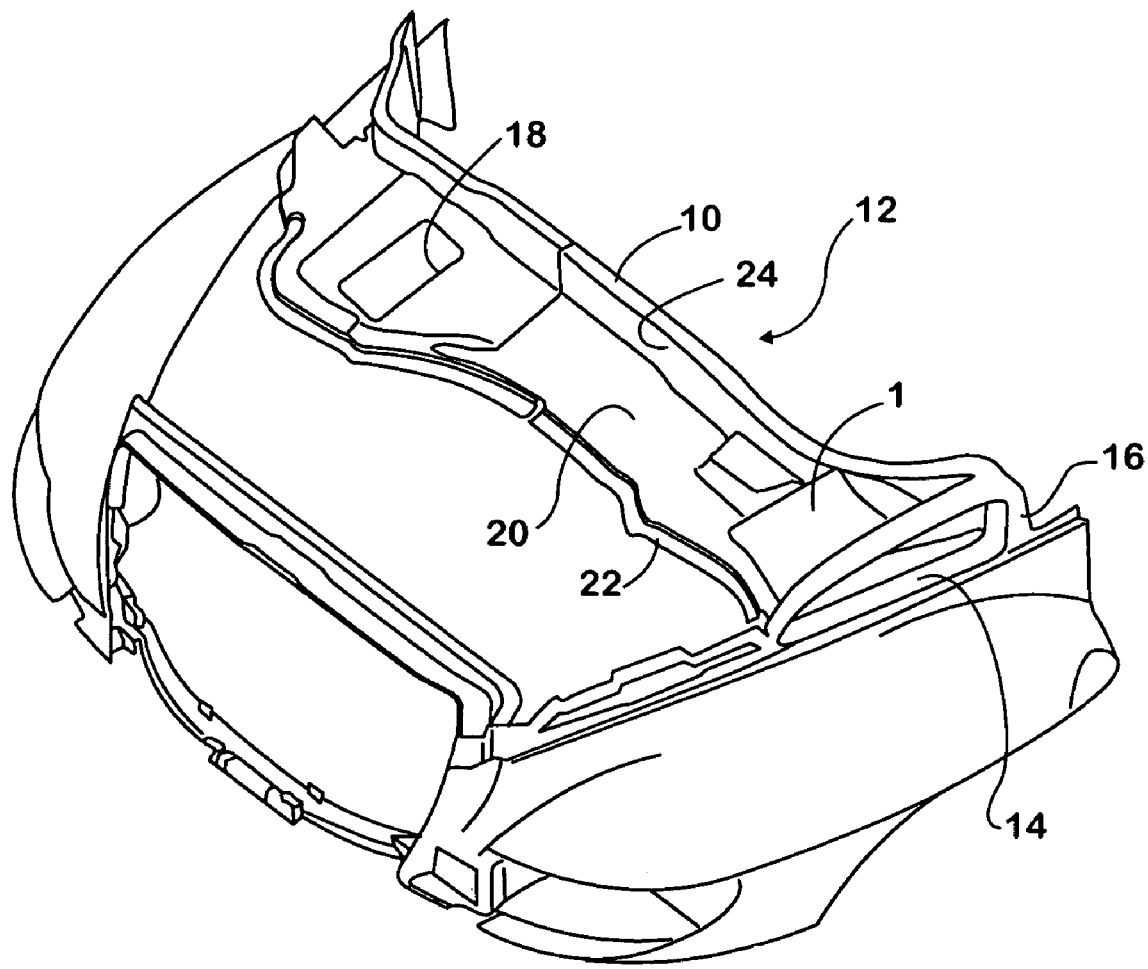
FIG. 2 is a top perspective view of a portion of the body of a vehicle having the prior art baffle in the air induction channel.

Referring to FIG. 1 and FIG. 2, a prior art baffle 1 is located in a hood portion 10 of an air induction channel, indicated generally as 12, where the induction channel has external air inlets 14 located at a side surface of the hood 16. An air outlet 18 is also located in the hood portion 10. The air travels into the air inlet 14, down and under the baffle 1, across the hood portion 10, and out the air outlet 18. The hood portion 10 is a channel defined by a bottom channel wall 20, a rear hood reinforcement wall 22, a cab wall 24 and an exterior skin 26.

To prevent contaminants such as road splash, water, dirt, and the like from entering the air outlet 18, the baffle 1 is disposed near the air inlet 14. However, the result of placing a baffle 1 at the air inlet 14 is that the pressure drop at the inlet is greatly increased, which increases the amount of work the engine performs to obtain air for combustion.

Figure 4:
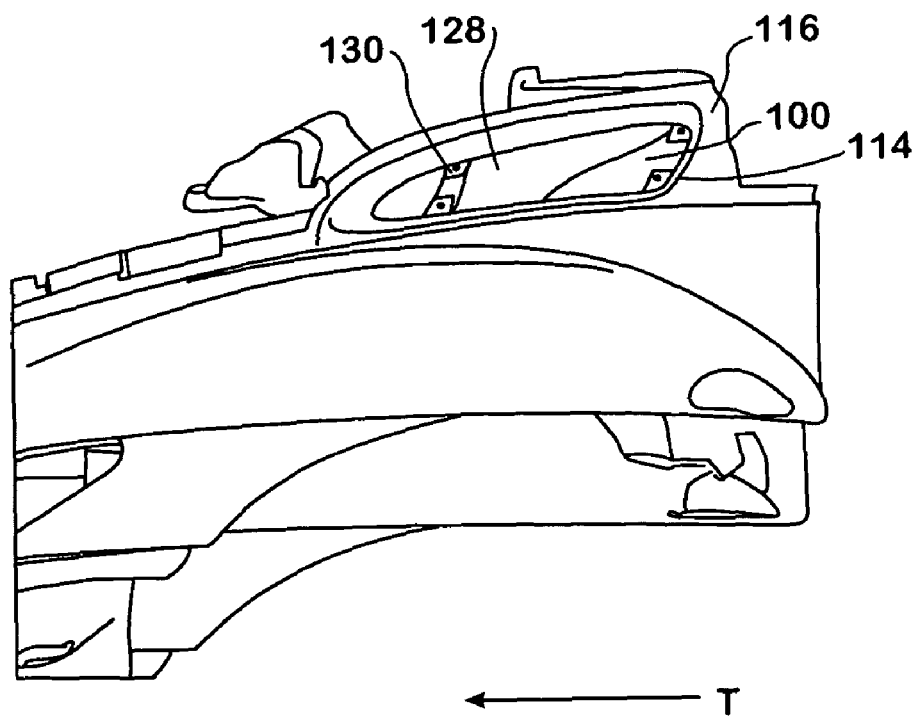
FIG. 4 is an elevation view of a portion of the body of the vehicle having the plenum in the air induction channel in accordance with the invention.
Figure 5:
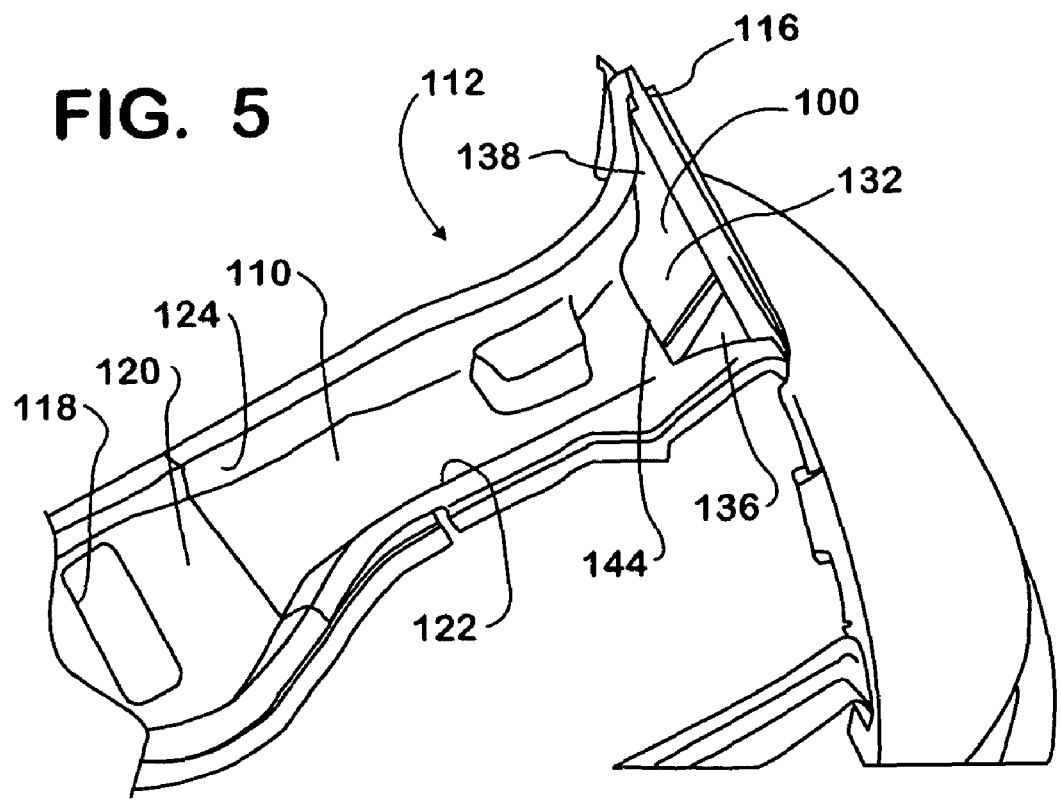
FIG. 5 is a top perspective view of a portion of the body of the vehicle having the plenum in the air induction channel in accordance with the invention.

Referring now to FIG. 3 through FIG. 5, an air intake plenum 100 is a generally locally narrowed channel that is disposed in a hood portion 110 of an air induction channel, indicated generally as 112, at an air inlet 114. The air inlet 114 is located at a side surface of the hood 116, and an air outlet 118 is located in the hood portion 110. The hood portion 110 is advantageously a channel defined by a bottom channel wall 120, a rear hood reinforcement wall 122, a cab wall 124, and an exterior skin 126. The air inlet 114 to the induction channel 112 is generally parallel to the direction of travel "T" of the vehicle (seen in FIG. 4), however it is contemplated that the inlet is angled slightly with respect to the direction of travel.

As seen in FIG. 4, the air intake plenum 100 includes a plenum inlet 128 that is generally planar with or inset slightly from the air inlet 114 at the side surface of the hood 116. The plenum inlet 128 is generally oval-shaped and corresponds to the shape of the air inlet 114. While the air inlet 114 has a generally oval-shape, it is contemplated that the air inlet can have other shapes, and in turn, the plenum inlet 128 can have other shapes, however it is preferable that the air inlet have a rounded shape.

The air intake plenum 100 is advantageously made of plastic, however other materials are contemplated. The plenum 100 is easily slipped into place into the air induction channel 112 by placing the plenum inlet 128 at the air inlet 114.

A plurality of fastener receivers 130 are disposed generally in the plane of the plenum inlet 128. The fastener receivers 130 are advantageously integrally formed into the air intake plenum 100 and have a front face 131 that is generally coplanar with the plenum inlet 128. The front face 131 has a receiving hole 133. As is known in the art, an air inlet grill (not shown) is disposed at the air inlet 118 of the vehicle to prevent larger contaminants from entering the air induction channel 112. The air intake plenum 100 is configured to be fastened to the air inlet grill by receiving fasteners (not shown) at the receiving hole 133 of the fastener receivers 130.

Figure 6:
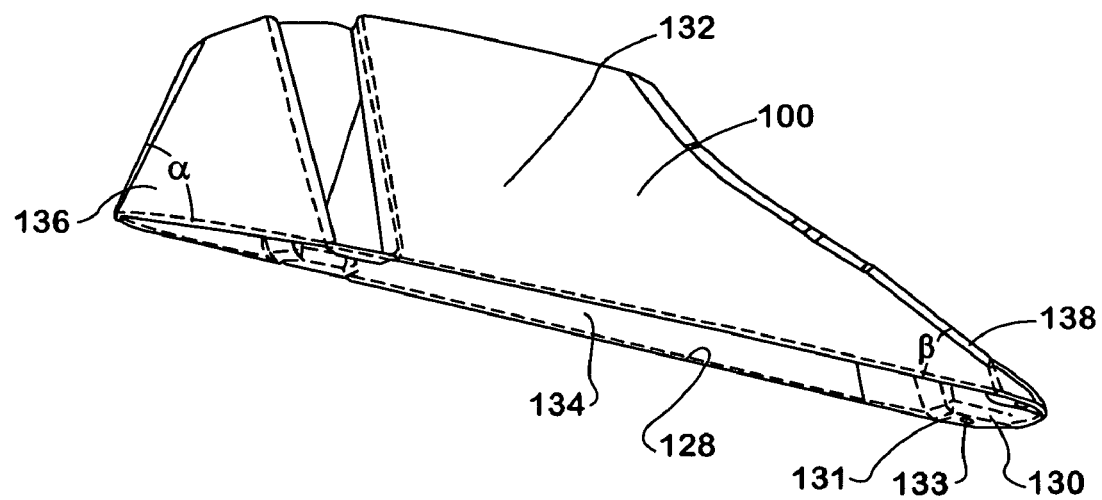
FIG. 6 is a top perspective view of the plenum in accordance with the invention.
Figure 7:
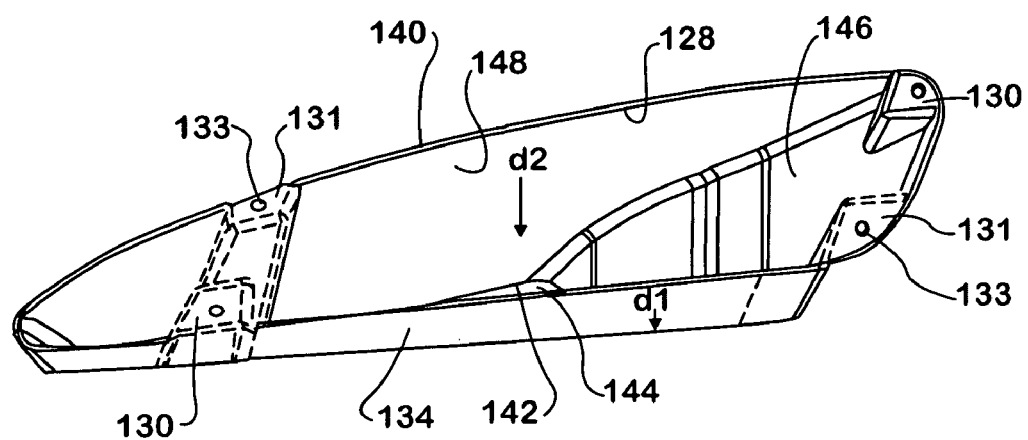
FIG. 7 is a front plan view of the plenum in accordance with the invention.
Figure 8:
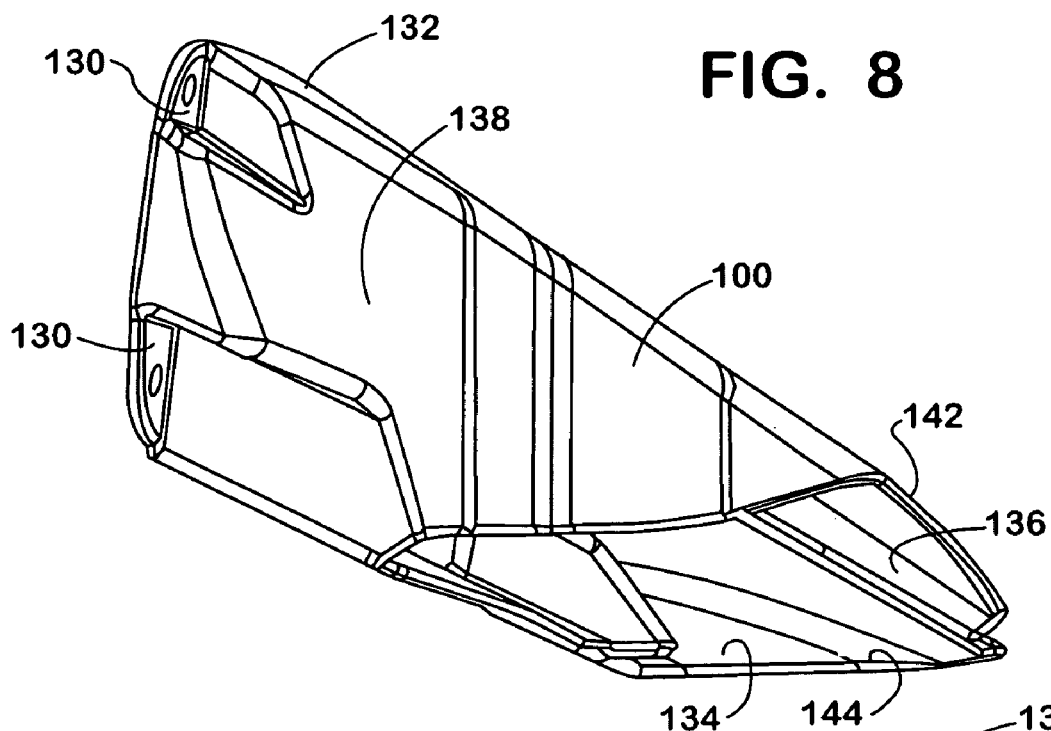
FIG. 8 is a right side view of the plenum in accordance with the invention.
Figure 9:
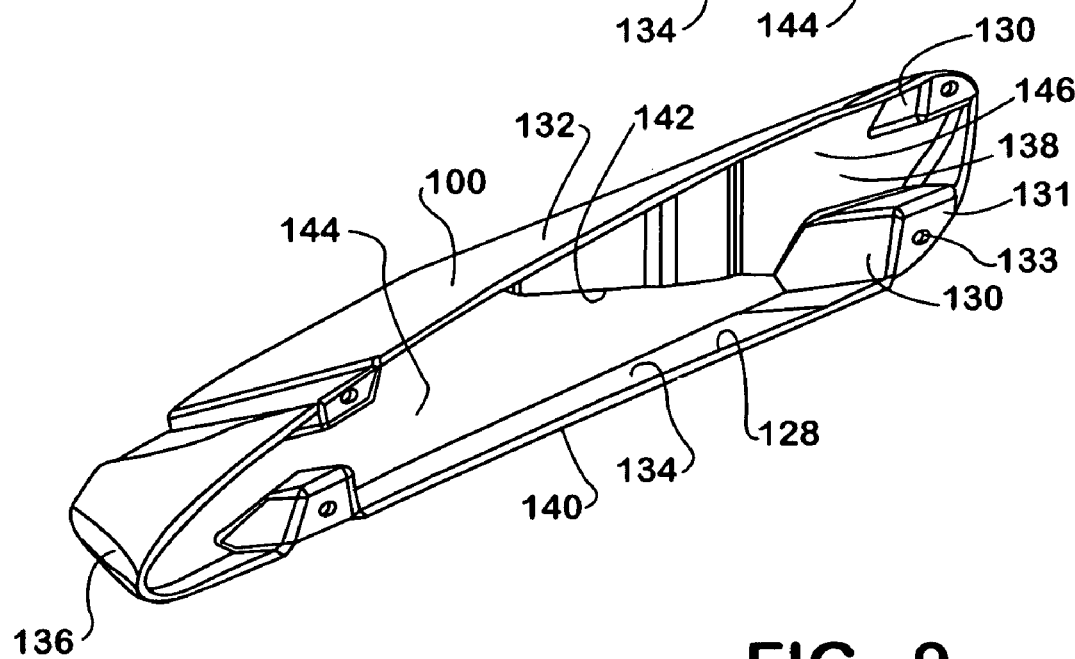
FIG. 9 is a front, left side perspective view of the plenum in accordance with the invention.
Figure 10:
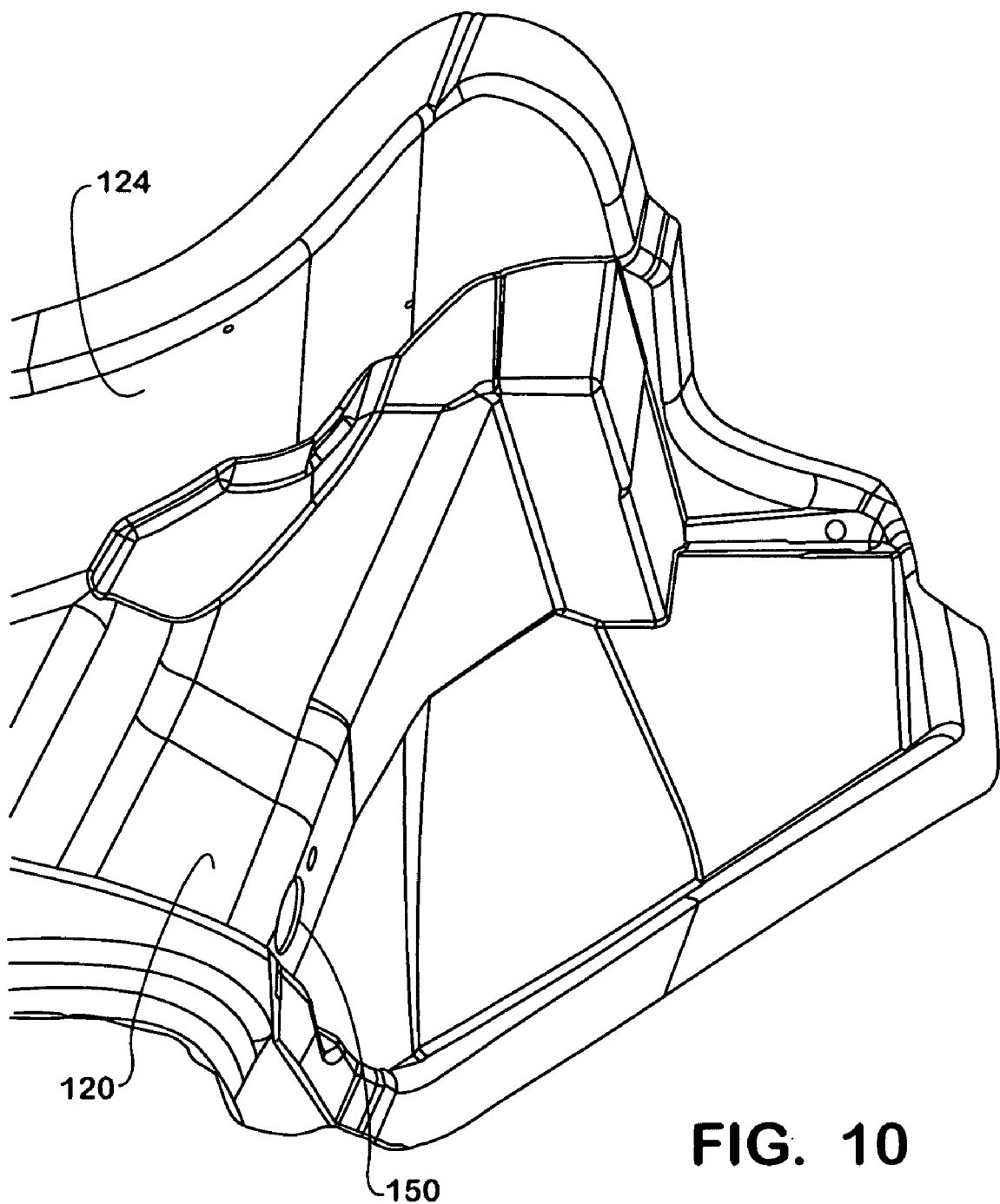
FIG. 10 is a front perspective view of a hole in a bottom wall of a rear reinforcement of the vehicle in accordance with the invention.

Referring now to FIG. 4 through FIG. 9, the air intake plenum 100 has an upper wall 132, a lower wall 134, a first side wall 136 and a second side wall 138. A front surface 140 defines the plenum inlet 128, and opposite the front surface is a rear surface 142 that defines a plenum outlet 144. The term "upper" is defined to be upwards away from the ground when the air intake plenum 100 is attached to the air inlet 114, which is located in the side surface of the hood 116 of the vehicle. Similarly, "lower" is defined to be downwards towards the ground when the air intake plenum 100 is attached to the air inlet 114 in the side surface of the hood 116 of the vehicle. As seen in FIGS. 4 and 7, the first side wall 136 has a smaller radius of curvature than the second side wall 138.

The plane of the plenum inlet 128 and the plane of the plenum outlet 144 are generally parallel, however it is contemplated that the planes can be skewed. The first side wall 136 extends at an acute angle α (FIG. 6) from the plenum inlet 128 to the plenum outlet 140. Angle α is advantageously in the range of about 45-90 degrees, and is about 70-degrees.

At the second side wall 138, there are two fastener receivers 130 that are disposed at the radial corners of the front surface 140. As seen in FIG. 6, the second side wall 138 extends at an acute angle β from the plenum inlet 128 to the plenum outlet 140. Angle β is advantageously in the range of about 0 to 45-degrees, and is about 30-degrees. As seen in FIG. 5, the second side wall 138 is configured to be disposed adjacent to the cab wall 124.

As seen in FIG. 7, the lower wall 134 extends from the front surface 140 to the rear surface 142 in a first downward sloping direction "d1". The downward direction is defined to be down towards the ground when the plenum 100 is installed in the air inlet 14 in a side surface of the hood 116.

The upper wall 132 extends from the front surface 140 to the rear surface 142 in a second downward sloping direction "d2". Advantageously, the slope "d2" is greater than the slope "d1" of the lower wall 134.

When the vehicle is moving in the forward direction of travel "T" (seen in FIG. 4), a first inside surface 146 of the second side wall 138 and a second inside surface 148 of the upper wall 132 are configured to receive the air through the air inlet 114. The air that flows through the plenum inlet 128 impinges on the first inside surface 146 and the second inside surface 148 where it then flows downward through the plenum 100 and towards the plenum outlet 144. After leaving the plenum outlet 144, the air is directed towards the bottom channel wall 120. When the air impinges on the bottom channel wall 120, the air contaminants drop out of the air flow. Gravity feeds the air contaminants downward towards at least one hole 150 at the bottom channel wall 120.

The pressure drop in the air induction channel 112 is greatly reduced with respect to the prior art baffle 1. The prior art baffle 1 had a pressure drop of about 1200 Pa, and the plenum 100 has a pressure drop of about 600 Pa. The pressure drop of the plenum 100 is minimally increased with respect to an air induction channel 112 with no baffle at all, which has a pressure drop of about 350 Pa. When the pressure drop of the air flow from outside air inlet 114 to the air outlet 118 is reduced, the amount of work the engine performs to obtain air for combustion is reduced.

The present air intake plenum 100 for an air induction channel 112 may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An air intake plenum disposed in an air induction channel in a hood defined by a bottom channel wall, a rear hood reinforcement wall, a cab wall, and an exterior skin, the air induction channel extending between an air inlet laying in a plane generally parallel with the direction of travel of the vehicle to an air outlet, the plenum comprising:
   a plenum inlet generally co-planar with the air inlet of the air induction channel, wherein the air intake plenum and the air induction channel generally lay in the same plane substantially over the length of the induction channel;
   at least one side wall extending from the plenum inlet to a plenum outlet, wherein in the direction from the plenum inlet to the plenum outlet, the at least one side wall is angled downwards towards the bottom channel wall;
   wherein air through the plenum inlet impinges against the at least one side wall, wherein the at least one side wall is a trailing surface of the plenum in the direction of travel and the air exits the plenum outlet, wherein the air intake plenum is configured to direct the air exiting the plenum outlet downward to impinge against the bottom channel wall of the air induction channel where contaminants drop out of the air.

2. The air intake plenum of claim 1 wherein the plenum inlet has a generally oval-shape.

3. The air intake plenum of claim 1 wherein the plenum is formed of plastic.

4. The air intake plenum of claim 1 further comprising at least one fastener receiver that is disposed generally in the plane of the plenum inlet.

5. The air intake plenum of claim 4 wherein the at least one fastener receiver is integrally formed into the air intake plenum and has a front face that is generally coplanar with the plenum inlet.

6. The air intake plenum of claim 1 further comprising an upper wall, a lower wall, and a first side wall, wherein the first side wall has a smaller radius of curvature than the at least one side wall.

7. The air intake plenum of claim 6 further comprising a front surface that defines the plenum inlet, and opposite the front surface is a rear surface that defines the plenum outlet, wherein the upper wall, the lower wall, the first side wall and the at least one side wall extend from the front surface to the rear surface.

8. The air intake plenum of claim 7 wherein the first side wall extends at an acute angle from the plenum inlet to the plenum outlet.

9. The air intake plenum of claim 8 wherein the acute angle is in the range of about 45-90 degrees.

10. The air intake plenum of claim 7 wherein the at least one side wall extends at an acute angle from the plenum inlet to the plenum outlet.

11. The air intake plenum of claim 10 wherein the acute angle is in the range of about 0 to 45-degrees.

12. An air intake plenum disposed in an air induction channel in a hood defined by a bottom channel wall, a rear hood reinforcement wall, a cab wall, and an exterior skin, the air induction channel extending between an air inlet laying in a plane generally parallel with the direction of travel of the vehicle to an air outlet, the plenum comprising:
   a front surface defining a plenum inlet that is generally co-planar with the air inlet of the air induction channel, wherein the air intake plenum and the air induction channel generally lay in the same plane substantially over the length of the induction channel;

a rear surface defining a plenum outlet;

an upper wall extending from the front surface to the rear surface, wherein from the front surface to the rear surface, the upper wall slopes downwards towards the bottom channel wall;

a lower wall extending from the front surface to the rear surface, wherein in the direction from the front surface to the rear surface, the lower wall slopes downwards towards the bottom channel wall;

wherein air through the plenum inlet impinges against at least one of the upper wall and the lower wall, and the air exits the plenum outlet wherein the air intake plenum is configured to direct the air downward to impinge against the bottom channel wall of the air induction channel where contaminants drop out of the air.

13. The air intake plenum of claim 12 wherein the plenum is formed of plastic.

14. The air intake plenum of claim 12 wherein the slope of the upper wall is greater than the slope of the lower wall.

15. The air intake plenum of claim 12 further comprising a plurality of fastener receivers that are disposed generally in the plane of the plenum inlet.

16. The air intake plenum of claim 15 wherein the fastener receivers are integrally formed into the air intake plenum and have a front face that is generally coplanar with the plenum inlet.

17. The air intake plenum of claim 12 wherein the plane of the plenum inlet and the plane of the plenum outlet are generally parallel.

18. The air intake plenum of claim 12 wherein the plenum inlet is generally oval-shaped.

19. The air intake plenum of claim 18 wherein one end of the oval-shaped plenum inlet has a smaller radius of curvature than a second end of the plenum inlet.

20. An air intake plenum disposed in an air induction channel in a hood defined by a bottom channel wall, a rear hood reinforcement wall, a cab wall, and an exterior skin, the air induction channel extending between an air inlet laying in a plane generally parallel with the direction of travel of the vehicle to an air outlet, the plenum comprising:

a front surface defining a plenum inlet that is generally co-planar with the air inlet of the air induction channel, the front surface having a plurality of fastener receivers that are disposed generally in the plane of the plenum inlet, wherein the air intake plenum and the air induction channel generally lay in the same plane substantially over the length of the induction channel;

a rear surface defining a plenum outlet;

an upper wall extending from the front surface to the rear surface, wherein in the direction from the front surface to the rear surface, the upper slopes downwards towards the bottom channel wall;

a lower wall extending from the front surface to the rear surface, wherein in the direction from the front surface to the rear surface, the lower wall slopes downwards towards the bottom channel wall;

a first side wall having a first radius of curvature extending from the front surface to the rear surface;

a second side wall having a second radius of curvature extending from the front surface to the rear surface, wherein the second radius of curvature is larger than the first radius of curvature wherein the second side wall is a trailing surface of the plenum in the direction of travel;

wherein air through the plenum inlet impinges against at least one of the upper wall and second side wall, and exits the plenum outlet, wherein the air intake plenum is configured to direct the air exiting the air intake plenum downward to impinge against the bottom channel wall of the air induction channel where contaminants drop out of the air.

* * * * *